United States Patent [19]
Skeie

[11] Patent Number: 5,249,243
[45] Date of Patent: Sep. 28, 1993

[54] APPARATUS AND METHOD FOR CASCADE COUPLED INTEGRATED OPTICAL PHASE MODULATOR FOR LINEARIZATION OF SIGNAL TRANSFER

[75] Inventor: Halvor Skeie, San Jose, Calif.

[73] Assignee: Siemens Components, Inc., Iselin, N.J.

[21] Appl. No.: 886,733

[22] Filed: May 21, 1992

[51] Int. Cl.[5] .............................. G02B 6/10; G02B 6/12
[52] U.S. Cl. .......................................... 385/3; 385/2; 385/14; 385/40; 385/41; 385/130; 385/132; 359/237; 359/245; 359/279
[58] Field of Search ................. 385/2, 3, 8, 9, 11, 385/14, 39, 40, 41, 130, 131, 132; 359/237, 245, 279

[56] References Cited

U.S. PATENT DOCUMENTS

| | | | |
|---|---|---|---|
| 4,223,977 | 9/1980 | Papuchon et al. | 385/14 X |
| 4,390,236 | 6/1983 | Alferness | 385/9 X |
| 4,448,479 | 5/1984 | Alferness | 385/3 X |
| 4,776,657 | 10/1988 | Reeder | 385/14 |
| 4,832,431 | 5/1989 | Nolting et al. | 385/3 X |
| 4,843,350 | 6/1989 | Nazarathy et al. | 385/3 X |
| 4,843,586 | 6/1989 | Nazarathy et al. | 385/3 X |
| 4,882,775 | 11/1989 | Coleman | 359/115 |
| 4,932,736 | 6/1990 | Su | 385/22 |
| 4,934,775 | 6/1990 | Koai | 385/2 |
| 4,934,776 | 6/1990 | Koai | 385/2 |
| 4,936,645 | 6/1990 | Yoon et al. | 385/2 |
| 4,947,170 | 8/1990 | Falk | 341/137 |
| 4,993,798 | 2/1991 | Thylen | 385/16 X |
| 4,997,245 | 3/1991 | DuPuy et al. | 385/16 |
| 5,002,353 | 3/1991 | Johnson | 385/3 |
| 5,010,346 | 4/1991 | Hamilton | 341/137 |
| 5,015,053 | 5/1991 | Johnson | 385/2 |
| 5,076,655 | 12/1991 | Bridges | 385/14 |
| 5,101,450 | 3/1992 | Olshansky | 385/3 |
| 5,109,441 | 4/1992 | Glaab | 385/3 X |
| 5,111,517 | 5/1992 | Riviere | 385/11 |
| 5,148,503 | 9/1992 | Skeie | 385/3 |

OTHER PUBLICATIONS

Z. Q. Lin and W. S. C. Chang, "Waveguide Modulators with Extended Linear Dynamic Range a Theoretical Prediction", *Photonics Technology Letters*, vol. 2, No. 12, Dec. 1990.

Pao-Lo Liu, B. J. Li, and Y. S. Trisno, "In Search of a Linear Electrooptic Amplitude Modulator", SPIE Conference, 1990.

R. B. Childs and V. A. O'Byrne, "Predistortion Linearization of Directly Modulated DFB Lasers and External Modulators for AM Video Transmission", *OFC 90*, 1990.

H. Skeie and R. V. Johnson, "Linearization of Electro-Optic Modulators By a Cascade Coupling of Phase Modulating Electrodes", SPIE Conference, vol. 1583, Integrated Optical Circuits, Sep. 1991, pp. 153-164.

*Primary Examiner*—Brian Healy
*Attorney, Agent, or Firm*—Joseph S. Codispoti

[57] ABSTRACT

An integrated cascaded optical phase modulator for providing linearized complementary modulated light output signals consists of the successive cascade of a first phase modulator stage, first fixed optical coupler, second phase modulator stage, and second fixed optical coupler. Rf modulating signals applied to each phase modulator stage are adjusted in amplitude, for compensating for errors in the coupling angles of the first and second optical couplers. The levels of DC bias voltages applied to each phase modulator stage are adjusted for compensating for asymmetric phase modulation.

20 Claims, 8 Drawing Sheets

APPARATUS AND METHOD FOR CASCADE COUPLED INTEGRATED OPTICAL PHASE MODULATOR FOR LINEARIZATION OF SIGNAL TRANSFER

RELATED APPLICATION

The present invention is related to Applicant's co-pending application Ser. No 07/706,911 filed May 29, 1991, now U.S. Pat. No. 5,148,503, and entitled "APPARATUS AND METHOD FOR LINEARIZED CASCADE COUPLED INTEGRATED OPTICAL MODULATOR", which is incorporated herein by reference.

FIELD OF THE INVENTION

This invention relates generally to modulators, and more particularly to a method and apparatus for providing linearized signal transfer in integrated electro-optical phase modulators.

BACKGROUND OF THE INVENTION

Integrated electro-optical modulators are finding increasing use in state-of-the-art analog optical-fiber communication systems. Such systems are being developed as an alternative to conventional electromagnetic transmission lines. Present optical-fiber communication systems may consist of a high power, low noise laser source in conjunction with a wide bandwidth external modulator, for example. Such external modulators may be used in conjunction with high power, low noise lasers, to provide analog signal transfer in optical fiber cable T.V. networks. A common problem in such systems is that the dynamic range thereof is limited by intermodulation distortion, and by harmonic distortion due to modulator nonlinearities. Many attempts have been made in the art to improve the linearity of the modulators.

One method of improving the linearity of optical modulators is to provide electromagnetic predistortion of the input signal. A system for accomplishing this is reported in an article by R. P. Childs and D. A. O'Byrne, that appeared in OFC 90, entitled "Predistortion Linearization of Directly Modulated DFB Lasers and External Modulators for AM Video Transmission."

There are many examples of electro-optical modulators, demodulators, and modulating systems in the art. A number of such prior systems are briefly discussed below.

Johnson U.S. Pat. Nos. 5,015,053 and 5,002,355 refer to linearization of an interferometric modulator by coupling to transverse electric (TE) and transverse magnetic (TM) modes. A carrier wave derived from a light source is polarized by a polarizer for adjusting the power of the carrier wave in the TE and TM polarization modes.

Hamilton et al. U.S. Pat. No. 5,010,346 shows an electro-optical analog-to-digital converter. A laser light source is synchronized with a digital clock for producing pulses of light. The pulses of light are modulated by an optical modulator for varying the intensity of the pulses of light as a function of the amplitude of the analog modulating signal. The light pulses are demultiplexed and passed through a detector for converting the light pulses to electrical signals. The electrical signals are then passed through an electrical analog-to-digital converter.

DuPuy et al U.S. Pat. No. 4,997,245 shows optical switches that are polarization independent. The optical switches include a substrate of electro-optic material in which waveguides are formed in a manner permitting light waves to be switched therethrough independent of polarization phenomena.

Thylen U.S. Pat. No. 4,993,798 refers to an optical communication system consisting of a semiconductor laser that includes an optical waveguide coupled at one end to first and second optical directional switches. The other ends of each one of the directional couplers each have an end of a waveguide terminated to a mirror, for forming a cavity including the laser diode. By either modulating current driving the diode, or by applying a modulating signal to the directional couplers, a light signal passing therethrough can be modulated.

Yoon et al U.S. Pat. No. 4,936,645 shows a polarization-insensitive Mach-Zehnder modulator that includes a thin film waveguide on a substrate. The modulator consists of a lamination of different organic polymers upon which the thin film waveguide is deposited, and electrodes for applying voltages for producing electric fields to coact with the light passing through the waveguides.

Koai U.S. Pat. No. 4,934,776 teaches the combination of cascaded individual waveguide directional coupler sections arranged to provide a high-density optical data array, for forming an integrated optical intensity modulator. The cascaded coupled-waveguide modulators provide ultra-high extinction ratios.

Koai U.S. Pat. No. 4,934,775 shows an optical space-division switching architecture consisting of high-extinction electro-optical data arrays of a plurality of cascaded coupled-waveguide optical intensity modulators. A plurality of passive splitter circuits are used to evenly divide an input optical signal into a plurality of interim optical signals. The optical signals are passed through the optical intensity modulators, respectively, which have waveguide coupler sections cascaded together on a crystal substrate to form a bar-type modulator structure, for providing a direct optical connection between the various sections of each modulator. Combiner circuits receive the output optical signals from the data arrays and combine them for providing a single output wave or signal.

Su U.S. Pat. No. 4,932,736 teaches the monolithic integration or three integrated waveguide couplers to provide a 1×2 or 2×1 integrated optical switch with a high extinction ratio. In the switch a first waveguide coupler has its output directly coupled to the input ports of the other two waveguide couplers via an integrated waveguide. As a result, two cascaded integrated waveguide couplers are provided along each path from a single input port to two output ports, respectively.

Coleman U.S. Pat. No. 4,882,775 shows a demodulator provided by a an interferometer and a signal processor. The demodulator is included in a coherence multiplexed, optical data transmission system. The optical data transmission system includes an interferometric modulator at an input end. The output signals therefrom are modulated waveforms which are passed through an optical multiplexer, and coupled via single mode optical couplers and a fiber optic cable to demodulator stages. Each modulator and demodulator stage is provided by an unequal arm-length Mach-Zehnder interferometer. The multiplexers phase modulate the optical carriers from the modulators for multiplexing the same together. The path lengths between the modulators and demodulators included in the system are controlled for obtaining a desired output from the output demodulator stages 40.

Alferness U.S. Pat. No. 4,390,236 shows an electro-optical demultiplexer consisting of a plurality of cascaded tunable, polarization independent optical wavelength filters. The various sections of the filters, as cascaded, provide an input polarization selective coupler that separates the transverse electrical (TE) and transverse magnetic (TM) orthogonally polarized wave components, respectively, of an arbitrarily polarized input signal. The separated TE and TM components then travel along two different wavepaths or waveguides. Each waveguide includes a wavelength selective mode converter. An output polarization selective coupler is provided for combining in one output waveguide signal components centered about the wavelength of the mode converters, and for combining in a second output waveguide the balance of the input signal.

Papuchon U.S. Pat. No. 4,223,977 shows an integrated optical circuit for separating a plurality of optical waves of different wavelengths, thereby providing a demultiplexing function. A plurality of basic electro-optical cells are integrated on a single substrate for providing the optical demultiplexing circuit.

A paper entitled "Waveguide Modulators with Extended Linear Dynamic Range a Theoretical Prediction" (Z. Q. Lin and W. S. C. Chang, *Photonics Technology Letters*, Vol. 2, No. 12, Dec. '90) shows a modified-directional-coupler modulator with reduced nonlinear distortion. The coupler includes an input stage for receiving input signals for a voltage control directional coupler that couples the signals to a Mach-Zehnder interferometer. The output of the interferometer is coupled by a fixed directional coupler to an output waveguide providing two channels. The parameters are adjusted for minimizing third order intermodulation spurious signals.

A paper entitled "In Search of a Linear Electro-optic Amplitude Modulator" (Pao-Lo Liu, B. J. Li, and Y. S. Trisno, SPIE Conference, 1990) shows a linear electro-optic amplitude modulator. The modulator includes a Y-branch for dividing an optical input signal equally for inputting into the two arms, respectively, of a Mach-Zehnder interferometer. The interferometer functions as a phase shifter. The output of the interferometer is supplied to a directional coupler having a nominal coupling constant-length product of half a coupling length. The optical output signal is provided at each of two output waveguides. A modulation signal of one polarity is applied to the interferometer phase shifter, and is applied in reverse polarity to the directional coupler using a multiplication factor. The parameters are adjusted for optimizing the linearity of the modulator by reducing the second and third order harmonics that cause nonlinearities to occur.

The present inventor recognized that known integrated optics modulators require further improvement. One need recognized is to improve the linearity of integrated optical phase modulators.

In a paper entitled "Linearization Of Electro-Optic Modulators By A Cascade Coupling Of Phase Modulating Electrodes" (Halvor Skeie and Richard V. Johnson, SPIE Conference, Vol. 1583, Integrated Optical Circuits, Sept. 1991, p. 153) shows two configurations for linearized optical modulators for use in wide band analog transmission systems. The linearization by cascading of Mach Zehnder structures is shown.

SUMMARY OF THE INVENTION

An object of the present invention is to provide an improved integrated optical phase modulator with complementary output signals.

Another object of the invention is to provide an integrated optical phase modulator having increased linearity and complementary output signals.

These and other objects of the invention to overcome the problems in the prior art and satisfy the identified need are provided in one embodiment of the invention by an integrated optical phase modulator including a Y-branch power splitter for receiving a light input signal, splitting the same into two output signals, and passing the output signals to a first phase modulator controlled by a signal voltage $V_1(t)$. A pair of output signals from the first phase modulator are corrected as input signals via a first fixed, coupler with coupling angle Y to a second phase modulator controlled by a signal voltage $V_2(t)$. A pair of output signals from the second phase modulator are connected as input signals to second fixed coupler with coupling angle $\gamma$, the latter providing complementary output signals of the cascaded modulator. In another embodiment, a 3 dB coupler is substituted for the Y-branch power splitter.

BRIEF DESCRIPTION OF THE DRAWINGS

Various embodiments of the present invention are illustrated below in conjunction with the accompanying drawings, wherein like items are identified by the same reference designation, and in which.

DETAILED DESCRIPTION OF PREFERRED EMBODIMENTS OF THE INVENTION

The linearized optical phase modulator embodiments of the present invention, as described below, may be considered linearized optical guided waveguide (OGW) modulators. In the various embodiments of the invention, each provides two complementary light output signals which offers advantages over prior modulators having only a single output signal In the present embodiments of the invention, the complementary output signals are substantially of the same power level and are equally linear, thereby splitting the available laser power. Another advantage is that one of the complementary output signals may be used as a control signal, preferably in a closed loop system, for providing a bias adjustment to optimize and stabilize the linearity of the cascaded modulators.

Figure 1:
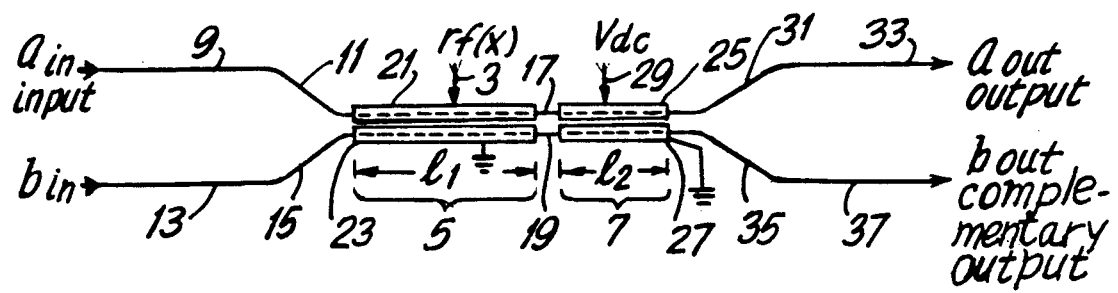
FIG. 1 is a simplified pictorial diagram showing a linearized single coupler with one rf input for one embodiment of the invention.

In FIG. 1, an improved linearized single coupler 1, having a single rf terminal 3 for receiving an rf input signal rf(x) is shown. Assuming an ideal coupler structure, coupler 1 includes two cascaded sections 5 and 7 having coupler lengths $l_1$ and $l_2$, respectively. An upper horizontal waveguide segment 9 conducts a light input signal $a_{in}$ to a downward sloping waveguide segment 11 for providing an input laser light signal to the coupler 1. Also shown, but typically not used for providing a light signal to the coupler 1, is a lower horizontal waveguide segment 13, for conducting a light signal $b_{in}$ into an upward sloping waveguide segment 15 for delivering the light signal $b_{in}$ to coupler 1. The first coupler section 5 includes in the integrated structure shown a portion of a horizontal waveguide segment 17 for receiving light input signal $a_{in}$ from waveguide segment 11, a portion of a lower waveguide segment 19 connected at one end to an output end of waveguide segment 15, an electrode 21 overlying an associated portion of waveguide 17, and an electrode 23 overlying an associated portion of waveguide 19. The terminal 3 is connected to electrode 21 for providing the rf signal rf(x) thereto. Electrode 23 is connected to a source of reference potential, ground in this example. Note that waveguides 17 and 19 are substantially parallel to one another as are electrodes 21 and 23.

The second coupler section 7 includes the remaining portions of waveguide segments 17 and 19, in this example. An electrode 25 overlies an associated portion of waveguide 17. An electrode 27 overlies an associated portion of waveguide 19. These elements are substantially parallel to one another. A bias terminal 29 is provided for connecting a DC bias voltage $V_{dc}$ to electrode 25. Electrode 27 is connected to ground, in this example. A light output signal from the cascaded first and second coupler sections 5 and 7 is conducted from waveguide segment 17 through an upwardly sloping waveguide segment 31, and through a horizontal waveguide segment 33 to provide an $a_{out}$ light output signal. Similarly, a light output signal $b_{out}$ is conducted from the other end of waveguide segment 19 through a downwardly sloping waveguide segment 35, and following horizontal waveguide segment 37 to provide a $b_{out}$ light output signal that is complementary to the $a_{out}$ light output signal. As previously mentioned, these complementary light output signals $a_{out}$ and $b_{out}$ are substantially equally linear, and of the same power level. Note that the various waveguide segments are typically formed on a lithium niobate crystal substrate (not shown), with the waveguide segments 9, 11, 13, 15, 17, 19, 31, 33, 35, and 37 being formed by diffusing titanium into the substrate. The electrodes 21, 23, 25, and 27 are typically deposited on top of the substrate, and typically may consist of metals such as a first adhesion layer of chrome (typically 100 Angstroms thick), followed by a thick layer of aluminum (up to 10,000 Angstroms). Note also that the shape of any of the electrodes and waveguides illustrated in the various embodiments herein are not meant to be limiting in that many shapes or configurations can be used therefor.

Assume that the coupler structure of FIG. 1 is an ideal one and that the two cascaded sections 5 and 7 have coupling angles $\gamma$ and $\gamma_d$, respectively, with no external voltages applied. Let the rf coupling be $\gamma \cdot x$. The two input-two output coupler 5,7 is described by its $2 \times 2$ transformation matrix M, as follows in equation (1):

$$\begin{pmatrix} a_{out} \\ b_{out} \end{pmatrix} = M \cdot \begin{pmatrix} a_{in} \\ b_{in} \end{pmatrix} \tag{1}$$

where "a", "b" represent complex signal amplitudes of the parallel waveguides.

The rf section 5 transmission matrix is described as follows:

$$M_{rf} = \begin{vmatrix} \cos\phi + j\gamma x \sin\phi/\phi, & -j\gamma\sin\phi/\phi \\ -j\gamma\sin\phi/\phi, & \cos\phi - j\gamma x\sin\phi/\phi \end{vmatrix} \tag{2}$$

where $$j = \sqrt{-1}, \phi = \gamma\sqrt{1 + x^2}$$

x is proportional to the input signal voltage rf(x). The dc bias section 7 is described as follows:

$$M_{dc} = \begin{vmatrix} \cos\phi_d + j\gamma_d q\sin\phi_d/\phi_d, & -j\gamma_d\phi_d\sin\phi_d/\phi_d \\ -j\gamma_d\sin\phi_d/\phi_d, & \cos\phi_d - j\gamma_d q\sin\phi_d/\phi_d \end{vmatrix} \tag{3}$$

where $\phi_d$ is $\gamma_d\sqrt{1 + q^2}$ q being proportional to the applied dc voltage.

To simplify calculations, equation 3 is rewritten as follows:

$$M_{dc} = \begin{vmatrix} \cos\alpha e^{j\beta}, & -j\sin\alpha \\ -j\sin\alpha, & \cos\alpha e^{-j\beta} \end{vmatrix} \tag{4}$$

where $$\tan(\beta) = \frac{q}{\sqrt{1+q^2}} \cdot \tan(\phi_d)$$

-continued and $$\sin(\alpha) = \frac{\sin(\phi_d)}{\sqrt{1 + q^2}}$$

The cascade coupling 5, 7 is described as follows:

$$M_t = M_{dc} \cdot M_{rf} \quad (5)$$

with signal input $a_{in}$, $b_{in}=0$, the signal transfer for output $a_{out}$ is described by $M_{t11}$ as follows:

$$M_{t11} = \cos\alpha^{j\beta} \cdot (\cos\phi + j(\gamma x \cdot \sin\phi)/\phi) - (\sin\alpha \cdot \gamma \cdot \sin\phi)/\phi$$
$$= re + j \cdot im \quad (6)$$

where re, im represent the real and imaginary parts, respectively. The output power proportional to the detected signal is as follows:

$$P/P_{in} = re^2 + im^2 = f(x) \quad (7)$$

The series expansion for f(x) is as follows:

$$f(x) = f(o) + df/dx(o) \cdot x + \tfrac{1}{2} \cdot d^2f/dx^2(o) \cdot x^2 + 1/6 \cdot d^3f/dx^3(o) \cdot x^3 + \ldots \quad (8)$$

In order to suppress second and third order distortion, the following relations are required:

$$d^2f/dx^2(o) = 0, \; d^3f/dx^3(o) = 0 \quad (9)$$

From equation (7) one can derive the following:

$$df/dx = 2re \cdot re' + 2im \cdot im'$$

$$d^2f/dx^2 = 2re'^2 + 2re \cdot re'' - 2im'^2 + 2im \cdot im'' \quad (10)$$

$$d^3f/dx^3 = 6re' \cdot re'' + 2re \cdot re''' + 6im' \cdot im'' + 2im \cdot im'''$$

where ', '', and ''' denote first, second, third derivatives. From equations (6) and (2), one can derive the following:

$$re'(0) = 0$$

$$re''(0) = -\gamma \sin\gamma \cdot \cos\alpha - \sin\alpha \cdot \cos\beta \cdot (\gamma \cdot \cos\gamma - \sin\gamma)$$

$$re'''(0) = 0 \quad (11)$$

$$im'(0) = \sin\alpha \cdot \sin\beta \cdot \sin\gamma$$

$$im''(0) = \sin\alpha \cdot \sin\beta (\gamma \cdot \cos\gamma - \sin\gamma)$$

$$im'''(0) = 3\cos\alpha(\gamma \cdot \cos\gamma - \sin\gamma)$$

From equation (9) and (10), one obtains the following:

$$d^2f/dx^2(0) = (0) \quad (12)$$

From equation (12) it can be shown that:

$$\sin^2(\gamma) \cdot \sin(\alpha) \cdot \cos(\beta) = 0 \quad (13)$$

In addition if:

$$d^3f/dx^3(0) = (0) \quad (14)$$

then $$\gamma - \tan\gamma = 0$$

Solving for $\gamma$ from equation (14), one obtains:

$$\gamma = 2.86 \cdot \pi/2 \sim 257.4°$$

The modulator sensitivity is proportional to the following:

$$df/dx(0) = \sin^2(\alpha) \cdot \sin^2(\gamma) \cdot \sin(\beta) \quad (15)$$

A practical solution to equation (13) is therefore as follows:

$$\cos\beta = 0, \; \beta = \pi/2, \; 3\pi/2 \text{ etc.} \quad (16)$$

For maximum sensitivity:

$$\sin(2\alpha) = 1 \text{ or } \alpha = \pi/4 \quad (17)$$

From equation (3), one can obtain the following values:

$$\phi_d = \pi/2 \quad (18)$$
$$\gamma_d = 1.11 \sim 63.6° \quad q = 1.0$$

Figure 2:
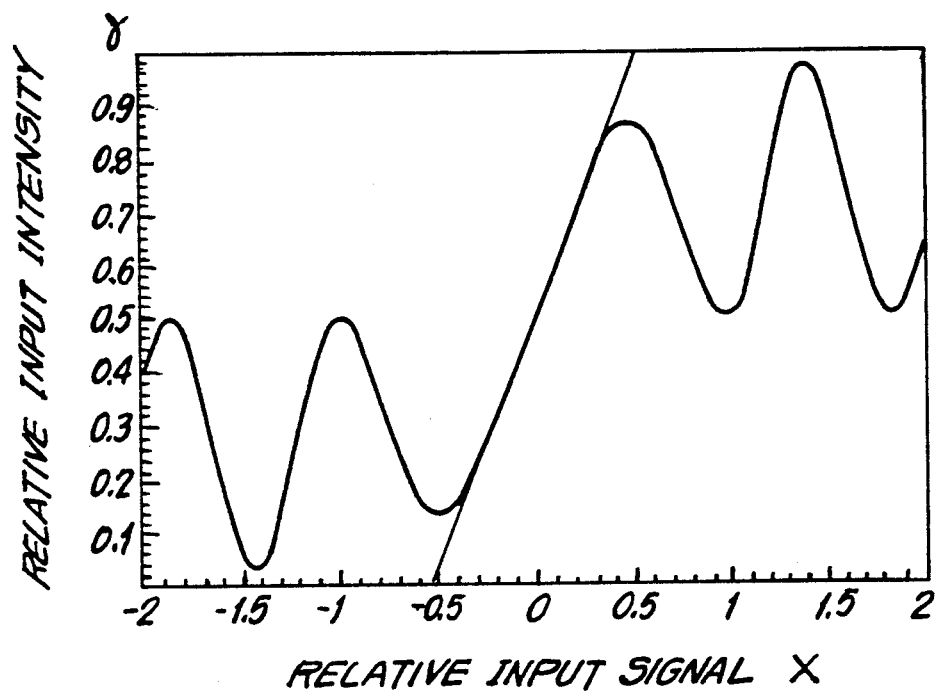
FIG. 2 is a plot or curve of the transfer function for optimized linear operation of the single coupler of FIG. 1.

A plot of a transfer function for optimized linear operation of the $\Delta\beta$ coupler of FIG. 1 is shown in FIG. 2, with $\gamma = 257.4°$, $\gamma_d = 63.6°$, and $q = 1.0$.

Figure 3:
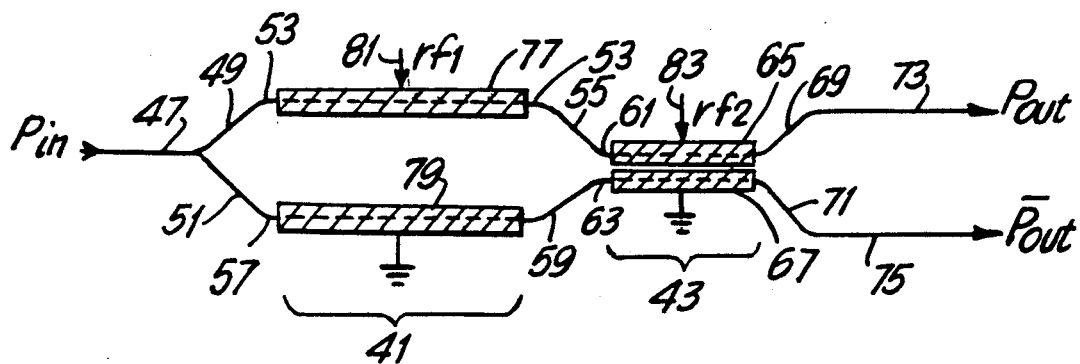
FIG. 3 is a simplified pictorial diagram of a phase modulator $\Delta\beta$ coupler cascade switch for an embodiment of the invention.

A phase modulator 41 in series with a $\Delta\beta$ coupler 43, as shown in FIG. 3, provides a phase modulator $\Delta\beta$ cascade switch 45. An input light wave $P_{in}$, typically having a power level expressed the light wave $P_{in}$ to be divided into upper waveguide segment 49 and lower waveguide segment 8 of the Y-waveguide 47, 49, 51. Light from the upper segment 49 travels through a longitudinal upper waveguide segment 53, through an upper downward sloping waveguide segment 55, through an upper longitudinal and horizontal waveguide segment 61, through an upwardly sloping waveguide segment 69, and therefrom through a longitudinal end horizontal waveguide segment 73 for providing an output signal $P_{out}$. Similarly, lower waveguide segment 51 receives substantially half of the light signal $P_{in}$ and conducts the same to travel through lower longitudinal and horizontal waveguide segment 57, therefrom through upward sloping waveguide segment 59, through lower horizontal waveguide segment 63, through downward sloping waveguide segment 71, and therefrom through lower horizontal waveguide segment 75, for providing from the latter a light output signal $\overline{P}_{out}$. $\overline{P}_{out}$ is complementary to the upper output signal $P_{out}$, in this example. A horizontal electrode 77 is both parallel and overlying to upper waveguide segment 53, for receiving via conductor 81 an rf input signal rf1. A lower electrode 79 is provided in parallel with and overlying the lower waveguide segment 57, as simplistically shown for purposes of illustration. Lower electrode 79 is connected to ground, in this example. The combination of waveguide segments 53 and 57, and electrodes 77 and 79, provide a phase modulator.

An electrode 65 is provided in parallel and overlying upper waveguide segment 61, and another electrode 67 is provided in parallel with and overlying lower waveguide segment 63. An electrode terminal 83 is provided for conducting to electrode 61 a second rf modulating signal rf2. Electrode 67 is connected to ground, in this example. The combination of waveguide segments 61 and 63, and electrodes 65 and 67 form a $-\Delta\beta$ coupler. Note that the length of the phase modulator section 41 is shown as a $l_1$, whereas the $-\Delta\beta$ coupler 43 has a length $l_2$.

Assuming an ideal, balanced configuration, rf electrodes 77, 79 with length $l_1$ will generate a phase shift $2\times$ between the two arms or waveguide segments 53 and 57 of phase modulator 41. The coupling angle of the $\Delta\beta$ coupler 43 is:

$$\Delta\beta = 2x' \quad (19)$$

where $x' = kx$.

The ratio $k = x'/x$ is proportional to the ratio of the two rf input signals $rf_1$ and $rf_2$ provided the electrode geometrics of electrodes 65 and 67, and associated impedance matching circuitry (not shown) are similar.

The phase modulator 41 transmission matrix is:

$$M_p = \begin{vmatrix} e^{jx}, 0 \\ 0, e^{-jx} \end{vmatrix} \quad (20)$$

The $-\Delta\beta$ coupler section 43 matrix is as follows:

$$M_c = \begin{vmatrix} \cos\phi + jx'\sin\phi/\phi, & -j\gamma\sin\phi/\phi \\ -j\gamma\sin\phi/\phi, & \cos\phi - jx'\sin\phi/\phi \end{vmatrix} \quad (21)$$

where $$\phi = \sqrt{\gamma^2 + x'^2}$$

The total matrix is then as follows:

$$M_t = \begin{vmatrix} e^{jx}(\cos\phi + jx'\sin\phi/\phi), & -je^{-jx}\gamma\sin\phi/\phi \\ -je^{jx}\gamma\sin\phi/\phi, & e^{-jx}(\cos - jx'\sin\phi/\phi) \end{vmatrix} \quad (22)$$

The output power is:

$$f(x) = (P_{out} + \overline{P}_{out})/P_{in} = \tfrac{1}{2}|mt_{11} + mt_{12}|^2 \quad (23)$$

From equation (22):

$$mt_{11} + mt_{12} = \cos x \cdot \cos\phi - \sin\gamma \\ \sin\phi/\phi - x'\sin x \cdot \sin\phi/\phi + (\sin x \cdot \cos\phi + x'\cos x \\ \cdot \sin\phi/\phi - \gamma \cos x \cdot (\sin\phi)/\phi) \quad (24)$$

By substitution into equation (23):

$$f(x) = 0.5 - \sin\phi/\phi \cdot (\sin(2x) \cos\phi + x' \cdot \cos(2x) \cdot \sin\phi/\phi) \quad (25)$$

By successive derivation of f(x) with respect to x, one obtains:

sensitivity $df/dx(0) = -\sin(2\gamma) - 0.5 \cdot k(1 - \cos(2\gamma))/\gamma$ $$\quad (26)$$

Second order distortion is expressed as follows:

$$d^2f/dx^2(0) = \text{for all values of } k, \gamma \text{ (no bias)} \quad (27)$$

Third order distortion is as follows:

$$d^3f/dx^3(0) = 0 \text{ for } k^3 + a_s k^2 + a_1 k + a_0 = 0 \quad (28)$$

where $$a_0 = -4\sin(2\gamma) \cdot \gamma^3/3 \cdot (\gamma\sin(2\gamma) + \cos(2\gamma) - 1)^{-1}$$

$$a_1 = -2(1 - \cos(2\gamma)) \cdot \gamma^2 \cdot (\gamma\sin(2\gamma) + \cos(2\gamma) - 1)^{-1} \quad (29)$$

$$a_2 = -(2\gamma\cos(2\gamma) - \sin(2\gamma))\gamma \cdot (\gamma\sin(2\gamma) + \cos(2\gamma) - 1)^{-1}$$

From (28) and (26) the coupling angle $\gamma$ and the sensitivity df/dx (0) for third order distortion compensation can be found as function of the rf weighting k.

Figure 4:
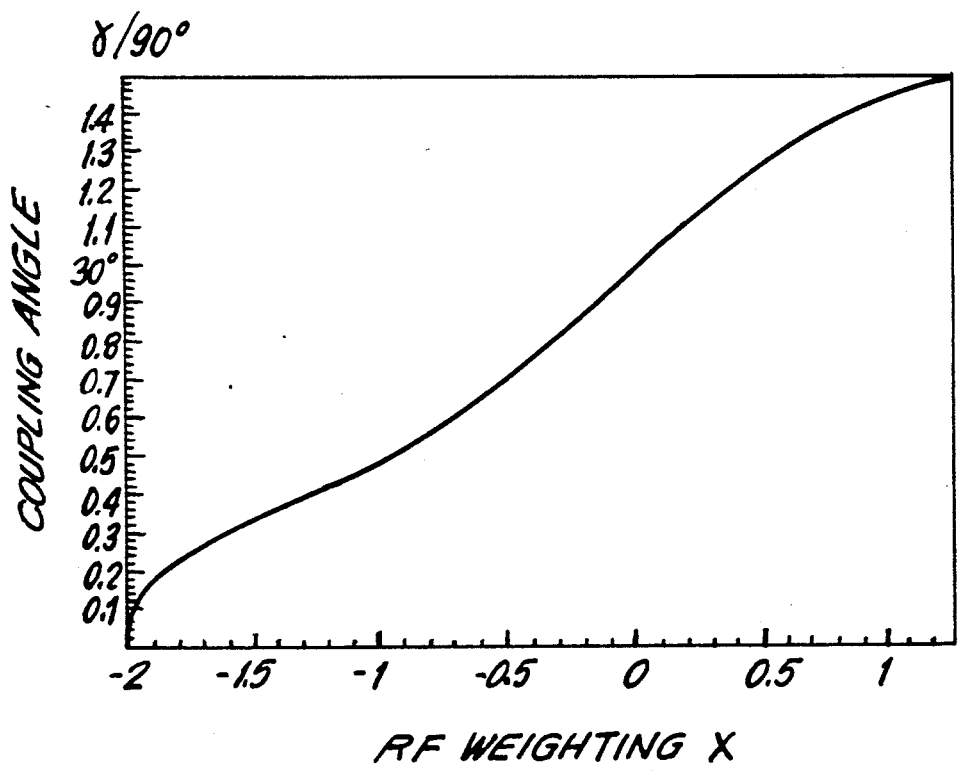
FIG. 4 is a curve showing the coupling angle $\gamma$ as a function of rf weighting for the phase modulator of FIG. 3.
Figure 5:
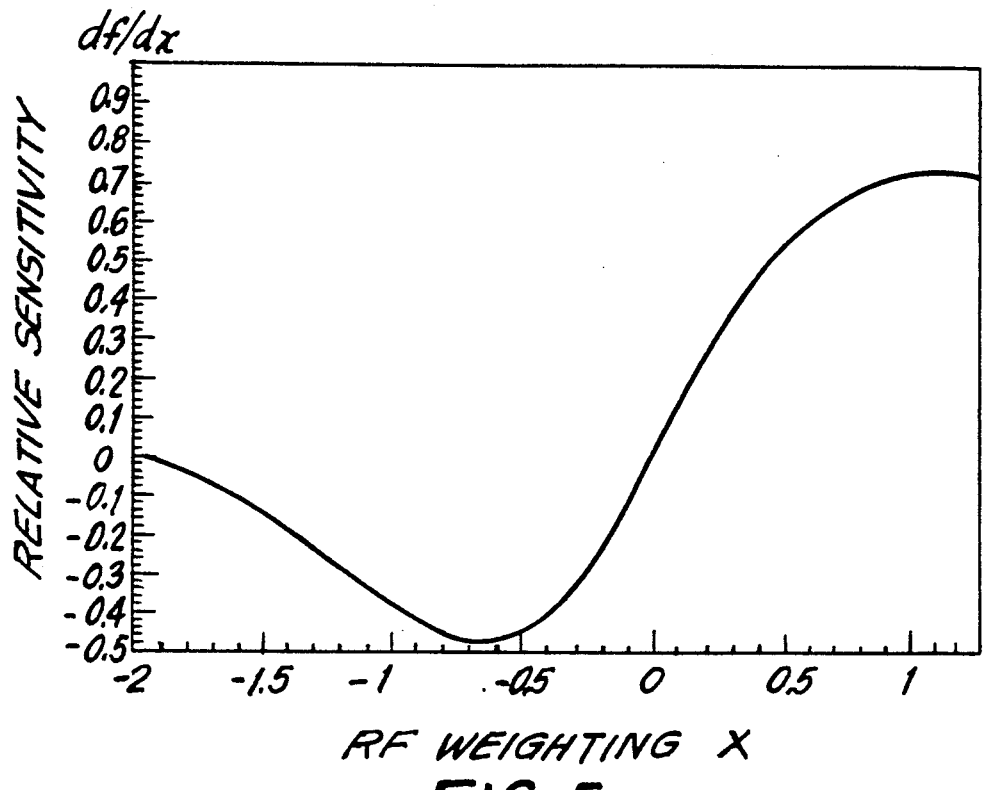
FIG. 5 is a curve showing the relative sensitivity as a function of rf weighting for the phase modulator of FIG. 3.

Results from these calculations are shown in FIGS. 4 and 5, for curves showing coupling angle $\gamma$ as a function of rf weighting, and relative sensitivity df/dx as a function of rf weighting, respectively.

Figure 6:
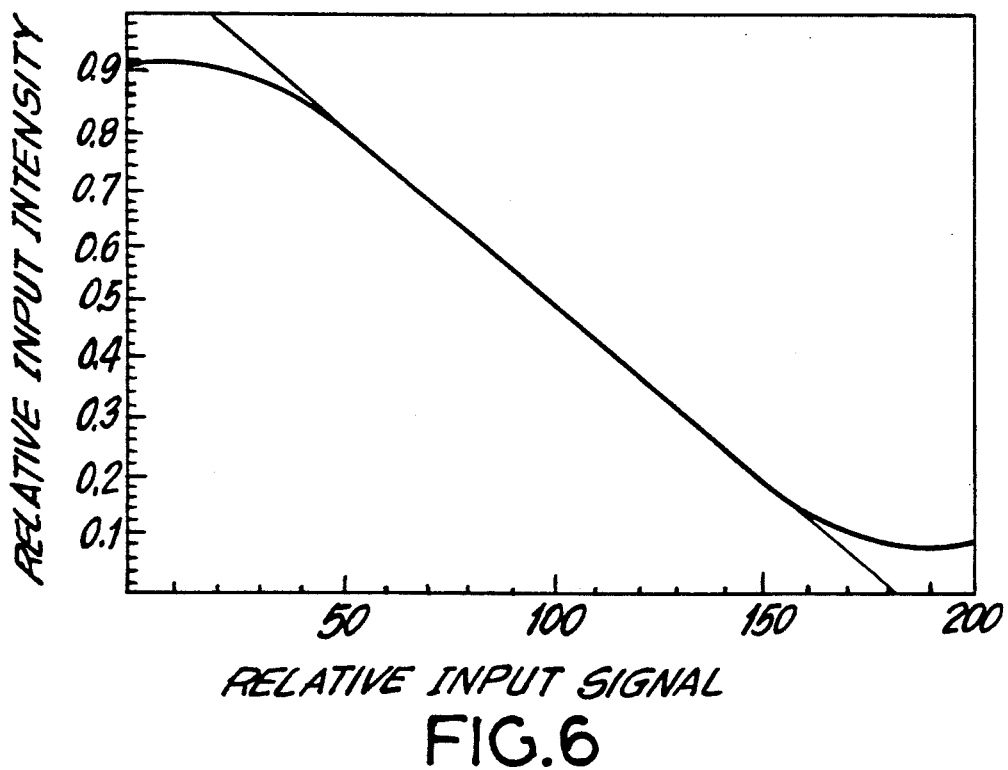
FIG. 6 is a curve showing a transfer function for the phase modulator-coupler cascade of FIG. 3, for $\gamma=45°$, and $k=-0.95$.
Figure 7:
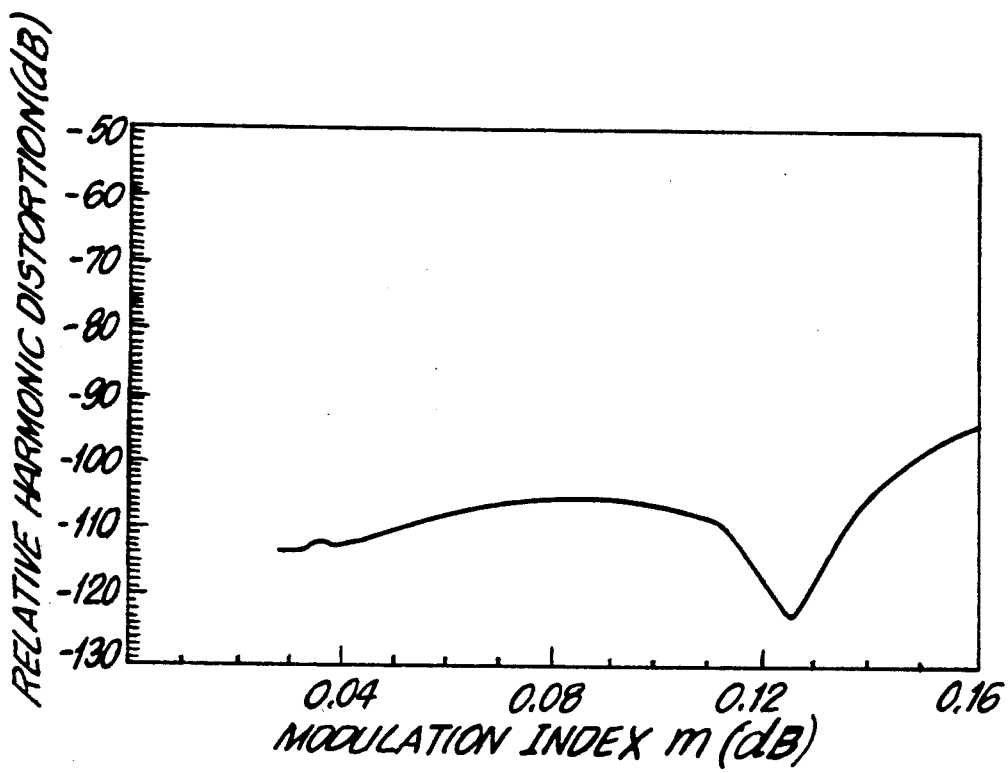
FIG. 7 is a curve showing the third harmonic suppression (dB) as a function of modulation index m (dB) for the phase modulator-coupler cascade of FIG. 3.

It appears from FIG. 5, that a reasonable sensitivity is obtained for weighting factors in the range of $-0.5$ to 1.5. Corresponding ranges for coupling angles are 45° to 65° and 105° to 140°. Consider as an example, $\gamma = 45°$. The calculated transfer function is shown in FIG. 6 as a plot of relative input intensity as a function of relative input signal. FIG. 7 shows relative harmonic distortion as a function of modulation index m.

Figure 8:
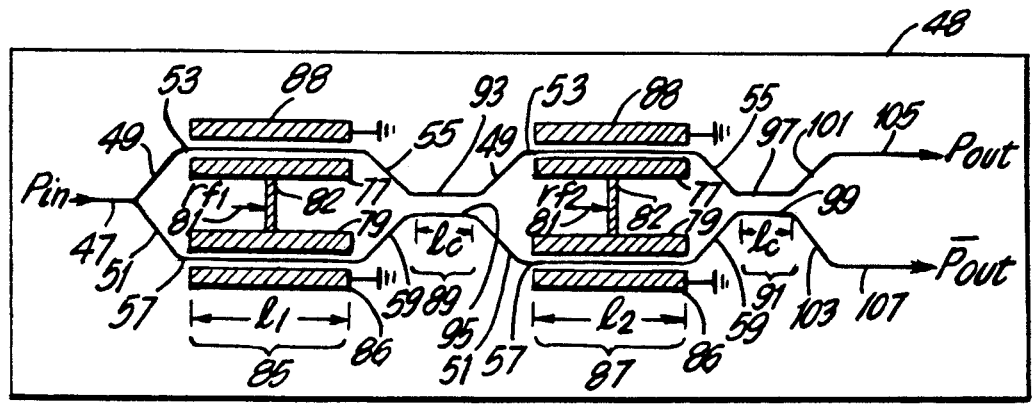
FIG. 8 shows a simplified pictorial diagram of cascaded rf phase modulators of one embodiment of the invention.

In FIG. 8, another embodiment of the invention is shown for cascading two phase modulators 85 and 87 with two fixed couplers 89 and 91. In comparison with the modulator embodiment of FIG. 3, each receives two input signals rf1 and rf2, for example, but a $\Delta\beta$ coupler region such as 43 is avoided in the embodiment of FIG. 8.

Phase modulators 85 and 87 have similar structure as phase modulator 41. One difference is that phase modulator 87 is configured for receiving via input electrode 81 the rf input signal rf2, and waveguide segments 49 and 51 receive complementary light signals from a coupler 89.

Also, in modulators 85 and 87, relative to modulator 41, electrodes 77 and 79 are located between, proximate, and parallel to waveguide segments 53 and 57, respectively, and electrically connected together by bridging electrode 82. Electrodes 88 and 86 are located proximate and in parallel with the other sides of waveguide segments 53 and 57, as shown in this example. Electrodes 88 and 86 are connected to a source of reference potential, ground in this example.

The fixed coupler 89 has a length $l_c$, and includes two parallel waveguide segments 93,95, for coupling output waveguide segment 55 to input waveguide segment 49, and output waveguide 59 to input waveguide segment 51, of phase modulators 85 and 87, respectively. Fixed coupler 91 is substantially similar to coupler 89, and consists of parallel waveguide segments 97 and 99 for coupling output waveguide segments 55 and 59, respectively, from phase modulator 87, to upward and downwardly sloping waveguide segments 101 and 103, respectively, in this example. Waveguide segments 101 and 103 have their other ends connected to an end of upper and lower horizontal and parallel waveguide segments 105 and 107, respectively. The other ends of the waveguide segments 105 and 107 provide complementary modulated light output signals $P_{out}$ and $\overline{P}_{out}$, respectively. Note that phase modulators 85 and 87 have lengths of l, and $l_2$, respectively, which are typically substantially equal.

In the embodiment of FIG. 8, the total transmission matrix consists of four cascaded section matrices as given below in equations (30), (31) and (32). Assume the fixed couplers 89 and 91 have identical coupling, their transmission matrix $M_c$ is as follows in equation (30):

$$M_c = \begin{vmatrix} \cos\gamma, & -j\sin\gamma \\ -j\sin\gamma, & \cos\gamma \end{vmatrix} \quad (30)$$

Rf phase modulator 85 has a transmission matrix $M_{P1}$ as follows:

$$M_{P1} = \begin{vmatrix} e^{jx}, & 0 \\ 0, & e^{-jx} \end{vmatrix} \quad (31)$$

Note that 2x, obtained in solving the matrix $M_{P1}$, is the phase difference in the two arms.

Similarly, for the second phase modulator 87, its transmission matrix is $M_{P2}$ as follows in equation (32):

$$M_{P2} = \begin{vmatrix} e^{jx'}, & 0 \\ 0, & e^{-jx'} \end{vmatrix} \quad (32)$$

where $x' = kx$, and $k = $ rf weighting factor.

The total matrix is the sum of the individual matrices as shown below in equation (33):

$$M_t = M_C M_{P2} M_C M_{P1} \quad (33)$$

Accordingly, $M_t$ can be expressed as shown below in equation (34):

$$M_t = \begin{vmatrix} \cos^2\gamma e^{j\psi_1} - \sin^2\gamma e^{j\psi_2}, & -j\sin\gamma\cos\gamma(e^{-j\psi_1} + e^{-j\psi_2}) \\ -j\sin\gamma\cos\gamma(e^{j\psi_1} + e^{j\psi_2}), & \cos^2\gamma e^{-j\psi_1} - \sin^2\gamma e^{-j\psi_2} \end{vmatrix} \quad (34)$$

where $\psi_1 = x + x'$ and $\psi_2 = x - x^1$.

The relative output power is as follows in equation (35):

$$F(x) = P/P_{in} = \tfrac{1}{2}(re^2 + im^2) \quad (35)$$

where $re = \cos^2\gamma \cdot \cos\psi_1 - \sin^2\gamma \cdot \cos\psi_2 - \sin\gamma \cos\gamma (\sin\psi_1 + \sin\psi_2)$, and $im = \cos^2\gamma \cdot \cos\psi_1 - \sin^2\gamma \sin\psi_2 - \sin\gamma\cos\gamma (\cos\psi_1 + \cos\psi_2)$.

From successive derivation:

Sensitivity $df/dx(0) = -\sin(2\gamma)(2\cos(2\gamma) + k) \quad (36)$

Second order distortion is expressed by:

$d^2f/dx^2(0) = 0$ for all values of $k$, $\gamma$ (no bias) $\quad (37)$

Figure 9:
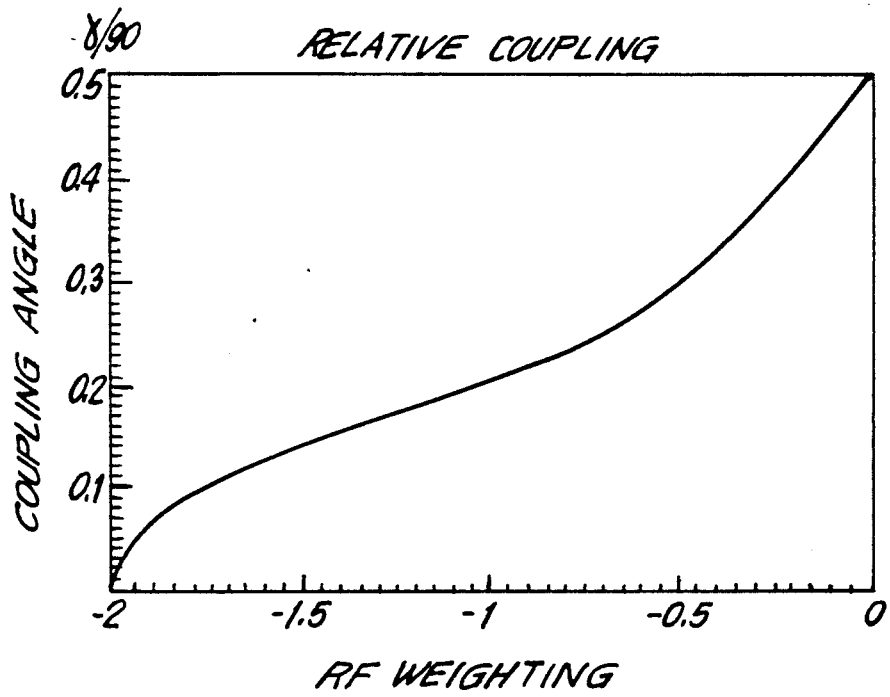
FIG. 9 is a curve showing the relative coupling angle ($\gamma/90$) as a function of rf weighting for the cascaded modulators of FIG. 8.

Third order distortion is expressed by:

$d^3f/dx^3(0) = 0$ for $k^3 + 3\cos(2\gamma)k^2 + 3k + 2\cos(2\gamma) = 0 \quad (38)$ From equations (36) and (38) the coupling angle $\gamma$ and the sensitivity $df/dx(0)$ for third order compensation can be determined as a function of rf weighting. Results are shown in FIGS. 9 and 10, for plots showing ($\gamma/90$) as a function of rf weighting, and rf sensitivity as a function of rf weighting, respectively.

Figure 12:
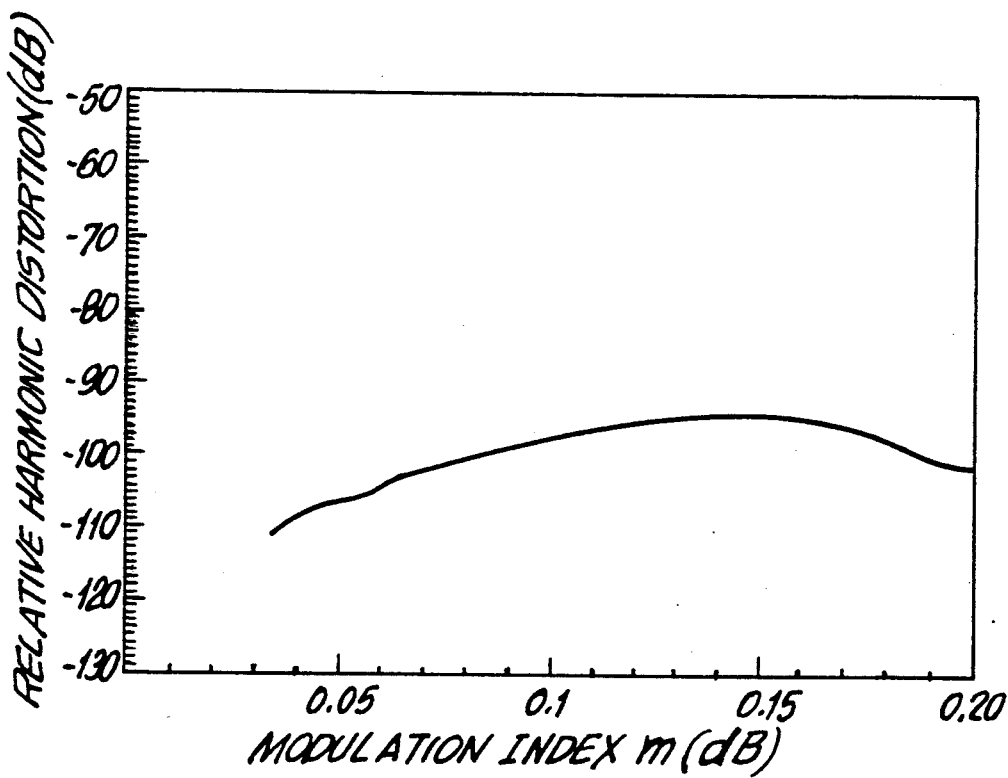
FIG. 12 is a curve showing the third harmonic suppression as a function of modulating index m for the cascaded modulators of FIG. 8.
Figure 10:
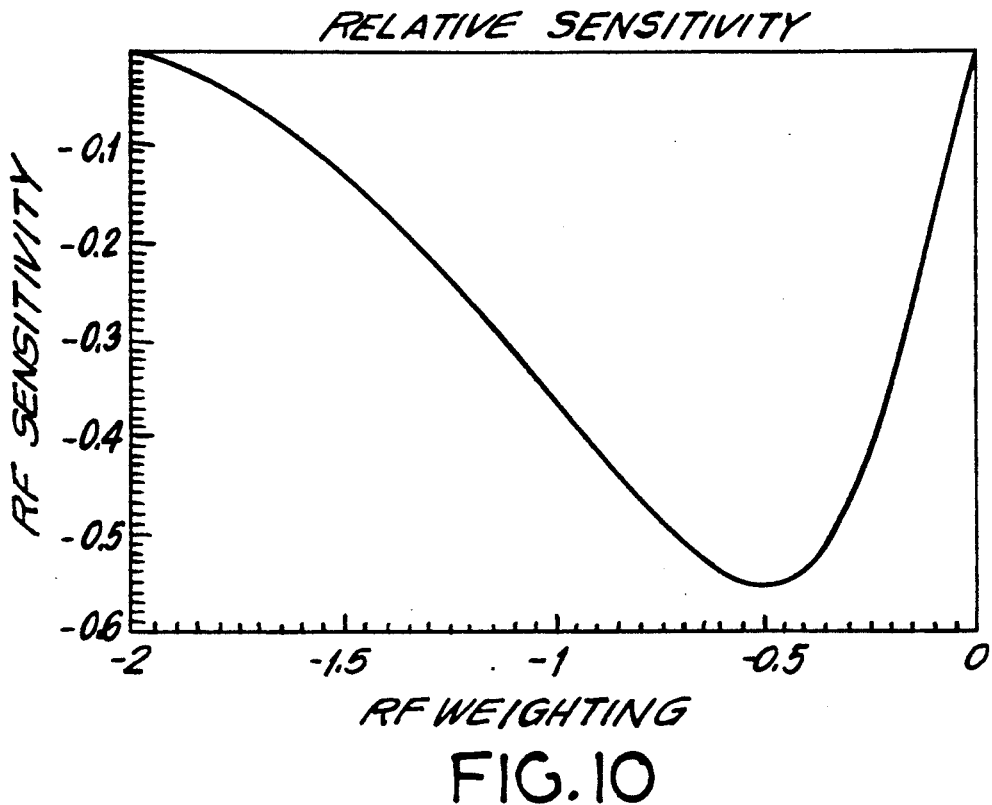
FIG. 10 is a curve showing the relative rf sensitivity as a function of rf weighting for the cascaded modulators of FIG. 8.
Figure 11:
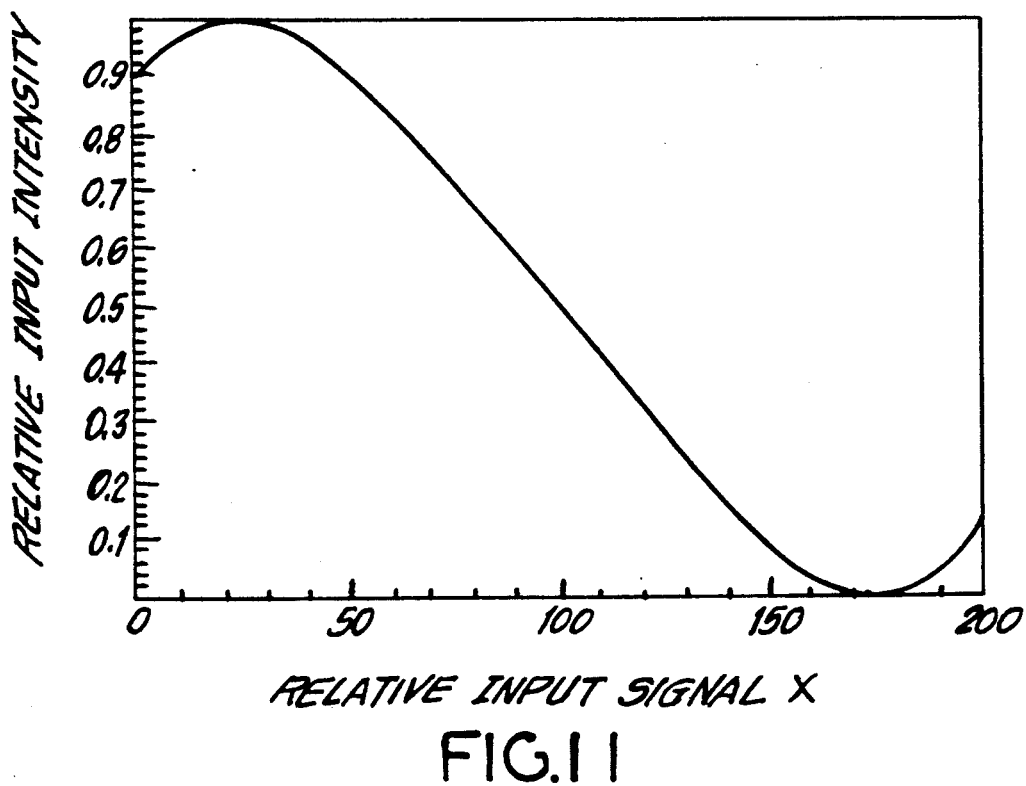
FIG. 11 is a curve showing a transfer function of the cascaded phase modulators of FIG. 8 for $\gamma=27°$ and $k=-0.5$.

FIG. 10 shows that an optimum operating point in terms of rf sensitivity is obtained if $k \approx -0.5$. This corresponds to a coupling range $\gamma$ of $0.3(90°) = 27°$. The calculated transfer function for this case is shown in FIG. 11, for relative input intensity as a function of relative input signal. The corresponding suppression of third harmonic generation as function of modulation index m is shown in FIG. 12.

In evaluating switch modulators with regard to practical implementation, from the standpoint of simplicity in both design and rf feeding circuitry, the embodiment of the invention of FIG. 1 ($\Delta\beta$ coupler with one rf-input) looks most attractive. However, certain drawbacks for a practical implementation would be:

1. The simple theory described allows for no bias adjustment to compensate for fabrication errors and imperfect behavior. In reality, additional fixed coupling regions outside the electrodes will be present, as well as asymmetries due to fabrication errors. Conceivably, these factors could be taken into account in a more sophisticated model. It is anticipated that by using additional bias electrodes, a good compensation of second and third order distortions could be obtained.

2. The optimum coupling angle is rather large ($Y = 257°$) which could make the overall device rather sensitive to fabrication errors. In general, the detailed behavior of multi-electrode couplers are somewhat more difficult to control than simple phase modulators.

The second alternative embodiment of FIG. 3 is slightly more complex than the embodiment of FIG. 1 in that the former requires two rf electrodes, 81 and 83, which have to be properly weighted, including external adjustments of signal amplitudes for modulating rf signals rf1 and rf2. Fabrication errors and additional fixed coupling regions can be adjusted for by using additional bias electrodes in both cascaded sections.

The third alternative embodiment of FIG. 8 has an apparent disadvantage in a slightly longer total waveguide structure, which could mean slightly increased throughput loss. However, with reasonable fabrication accuracy, it is expected that fine tuning of the coupler regions, 89 and 91, will not be necessary. Fabrication errors and modest environmental instabilities can be easily handled by adjusting dc voltages at bias electrodes 81 in the two phase modulator sections 85 and 87.

Figure 13:
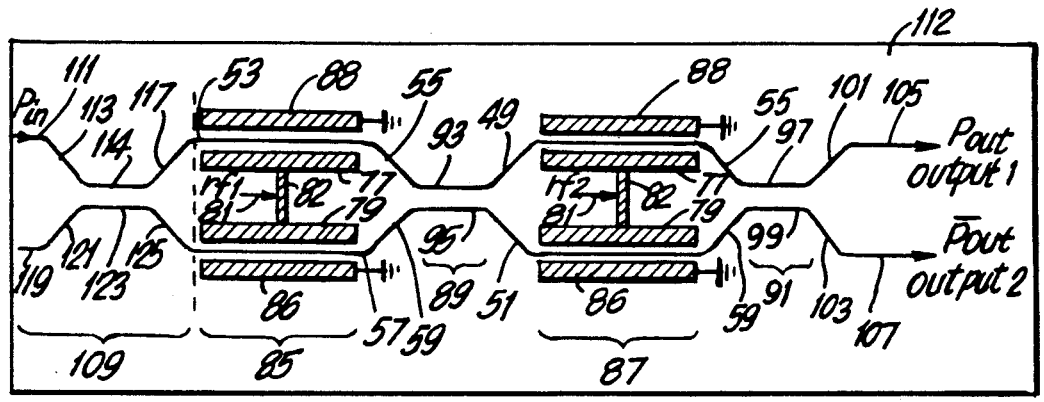
FIG. 13 shows a simplified pictorial diagram of cascaded rf phase modulators for another embodiment of the invention.

The embodiment of the invention of FIG. 8 can be modified as shown in FIG. 13 for substituting a 3 dB coupler for the Y-branch power splitter formed by waveguide segments 47, 49, and 51 at the input of phase modulator 85. In this embodiment, the 3 dB coupler 109 includes an input waveguide segment 111 for receiving a light input signal $P_{in}$, and guiding the same to a downward sloping waveguide segment 113 connected successively in series with a horizontal waveguide segment 114, and an upward sloping waveguide segment 117, the latter feeding an input signal into the upper waveguide segment 53 of phase modulator 85. Similarly, coupler 109 includes lower waveguide segments successively connected in series including an input segment 119, an upward sloping segment 121, a horizontal segment 123 parallel to the upper horizontal waveguide segment 114, and a downward sloping segment 125 connected to the lower horizontal waveguide segment 57 of phase modulator 85. Note that the modulator structure is fabricated on a substrate 112. The signal transfer function for relative power output of the modulator for this alternative embodiment is shown in equation (36). Equations (37) and (38) also are applicable to this embodiment of the invention.

Figure 14:
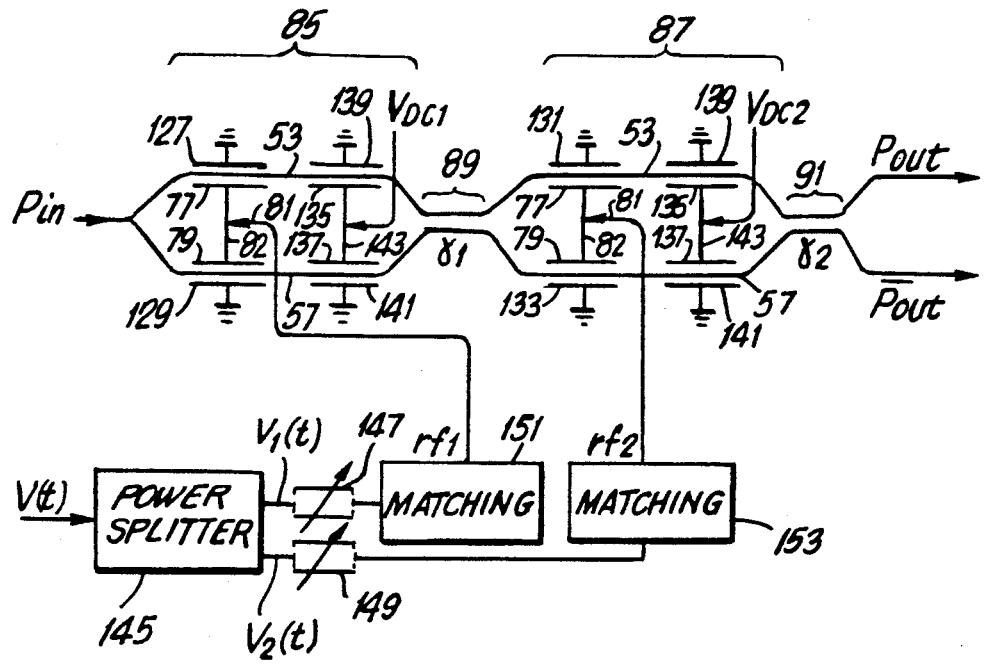
FIG. 14 shows a simplified pictorial diagram of cascaded rf phase modulators for a preferred embodiment of the invention.

In FIG. 14, another embodiment of the invention that is a modification of the embodiment of FIG. 8, includes for phase modulator 85 the addition of dc bias electrode 135 parallel to a portion of waveguide segment 53, and bias electrodes 137 parallel to a portion of waveguide segment 57, with ground plane electrodes 139 and 141 added in parallel to bias electrodes 135 and 137, respectively. In addition, a bias electrode 143, for receiving a dc bias voltage $V_{DC1}$ is connected in common to bias electrodes 135 and 137. Similarly, for phase modulator 87, bias electrodes 135 and 137 have been added in parallel with ground electrodes 139 and 141, respectively, on either side of waveguide segments 53 and 57, respectively. However, input electrode 143 of phase modulator 87 provides for the connection to a dc bias voltage $V_{DC2}$ rather than $V_{DC1}$ as in phase modulator 85. Further, a modulating voltage V(t) is provided to a power splitter 145, such as a Y-branch power splitter, for splitting the input signal V(t) into two substantially equal rf signals $V_1(t)$ and $V_2(t)$, for connection to the input terminals of variable rf attenuators 147 and 149, respectively. The output of variable attenuator 147 is connected to the input of impedance matching circuitry 151, the output of the latter providing rf signal rf1 to electrode 81 of phase modulator 85. Similarly, impedance matching circuitry 153 is included for receiving the output signal from attenuator 149 for providing rf modulating signal rf2 to electrode 81 of phase modulator 87. The modulator structure of FIG. 14 is a practical implementation with low switching or modulating voltage. Due to fabrication inaccuracies, the coupling angle $\gamma$ for couplers 89 and 91, respectively, may deviate from intended design values. With the embodiment of FIG. 14, errors due to such fabrication inaccuracies are compensated for by using variable attenuators 147 and 149 to adjust the amplitudes of the rf signals applied to matching circuits 151 and 153. Also, fabrication errors may cause asymmetric phase modulation, which is compensated for in this embodiment by adjusting the levels of the dc-bias voltages $V_{DC1}$ and $V_{DC2}$ through use of adjustable DC voltage supplies (not shown), for example. Further note that the external matching circuitry 151 and 153 provides for insuring a flat and equal frequency response for rf input signals rf1 and rf2, by phase modulators 85 and 87, respectively. Note further that the level of the light input signal $P_n$ is typically in the range of 10 to 100 millivolts, and the rf modulating signal V(t), is typically is 0 to 10 dBm for a cable TV signal, for example.

Figure 15:
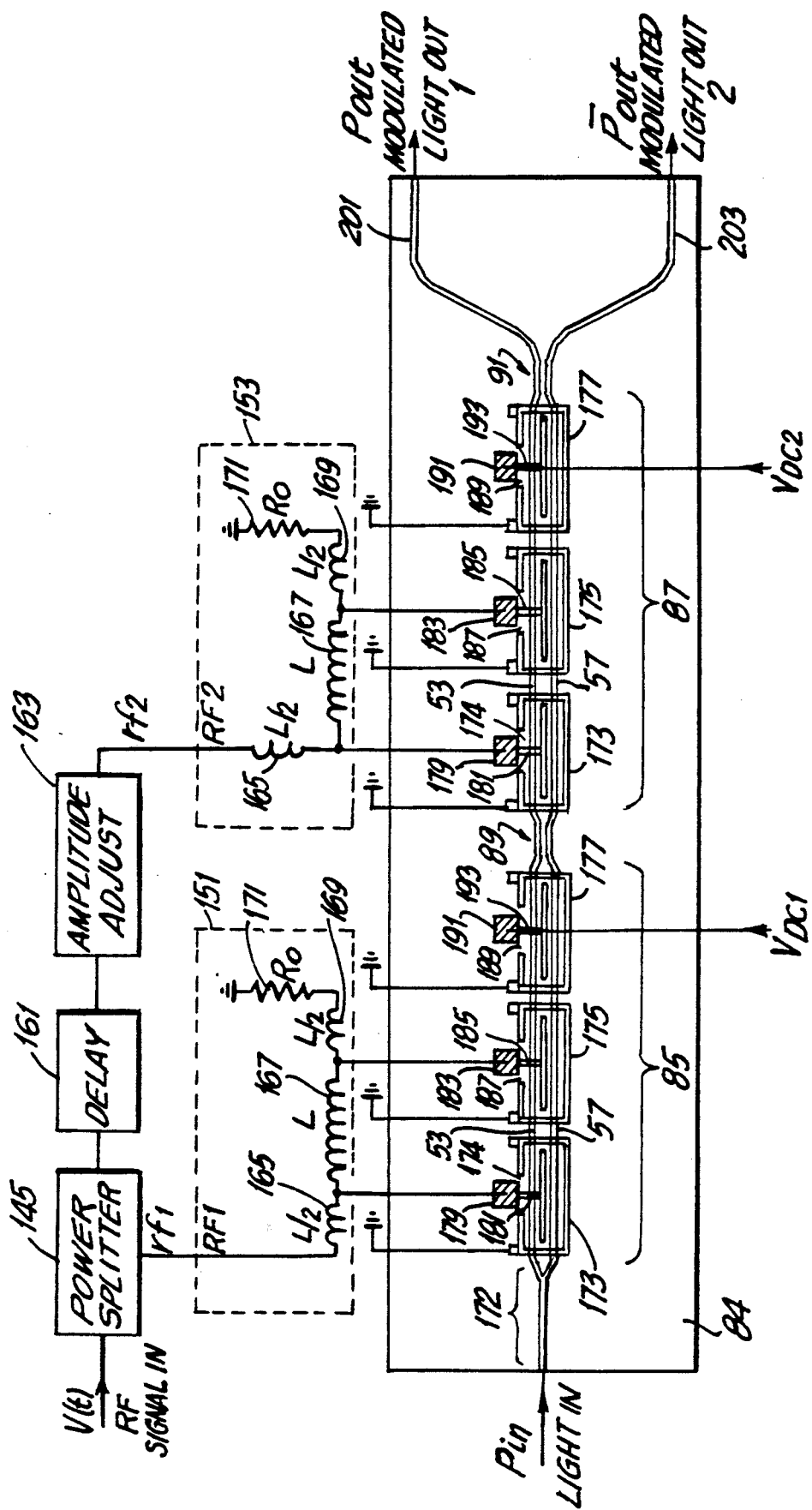
FIG. 15 shows a simplified schematic and pictorial diagram of an engineering prototype for the embodiment of FIG. 14.

In FIG. 15, a linearized modulator prototype design is shown, that is related to the simplified configuration of the modulator of FIG. 14. Similar items between the two figures are indicated by the same reference designation.

As shown in FIG. 15, the linearized modulator 84 includes an input waveguide in the form of a Y-splitter 172, for receiving and splitting a light input signal $P_{in}$, and guiding the split light signals into elongated waveguides 53 and 57, respectively, of phase modulator 85. The fixed coupler 89 couples the output light signals from waveguides 53 and 57 to the like waveguides 53 and 57, respectively, of phase modulator 87. The output light signals from phase modulator 87 are coupled by fixed coupler 91 to output waveguides 201 and 203, respectively, for providing complementary $P_{out}$ and $\overline{P}_{out}$ modulated and linearized light output signals, respectively. In this configuration, ground plane or RFI electrodes 173, 175, and 177, are generally rectangular in shape, successively juxtaposed from one another, and overlie the elongated parallel waveguides 53 and 57, of the associated phase modulators 85, 87, respectively, as shown. The parallel and opposing longer sides of each of the RFI electrodes 173, 175, 177 are positioned to be parallel to the waveguides 53 and 57, and on the outside thereof, in this example. Centrally located openings 174, 187, 189, are formed in a like elongated side of each one of the RFI electrodes 173, 175, 177, respectively, for permitting the leg portions of T-shaped electrodes 181, 185, and 193, respectively, to pass therethrough. As shown, for each of the T-shaped electrodes 181, 185, 193, the top associated narrow electrode portions are positioned parallel to and between waveguides 53 and 57, and within the rectangular area formed by the RFI electrodes 173, 175, and 177, as shown. The T-shaped electrodes 181, 185, and 193, have their leg portions terminating at and connected to connection or terminals pads 179, 183 and 191, respectively.

For each of the phase modulators 85 and 87, the RFI electrodes 173, 175, and 177, are connected to a source of reference potential, ground in this example. Phase modulator 85 has connection or terminal pads 179 and 183 connected to impedance matching circuit 151 for receiving a portion of a modulating signal rf1. Terminal pad 191 is connected to receive the DC bias voltage $V_{DC1}$. Similarly, phase modulator 87 has terminal pads 179 and 183 connected to impedance matching circuit 153 for receiving an rf modulating signal rf2, and terminal pad 191 is connected to receive DC bias voltage $V_{DC2}$.

Impedance matching circuits 151 and 153 include three inductors 165, 167 and 169, connected in series with a load resistor 171. One end of the load resistor 171 is connected to a source of reference potential, ground in this example. The other end of inductor 165 of matching circuit 151 is connected to receive modulating signal rf1. Similarly, the other end of inductor 165 of matching circuit 153 is connected to receive another modulating signal rf2. In matching circuit 151, the common connection between inductors 165 and 167 is connected to terminal pad 179 of modulator stage 85, and the connection between inductors 167 and 169 is connected to terminal pad 183 of modulator stage 85. In matching circuit 153, the common connection between inductors 165 and 167 is connected to terminal pad 179 of modulator stage 87, and the common connection between inductors 167 and 169 is connected to terminal pad 183 of modulation stage 87.

RF input signal V(t) is connected to a power splitter 145. One output signal from splitter 145 provides modulating signal rf1 to matching circuit 151. The other output signal from power splitter 145 is connected through an adjustable delay circuit 161 to adjustable amplitude control circuit 163. The output signal from the adjustable amplitude control circuit 163 provides modulating signal rf2 to matching circuit 153.

In the linearized modulator of FIG. 15, the RFI electrodes 173 and 175 are, in this example, divided into two separate configurations to facilitate electrical or impedance matching to the characteristic impedance of load resistor 171 in the associated matching circuit 151 or 153. Also in this manner, resistive losses in the electrode structures for electrodes 173 and 175 are minimized. Alternatively, but less preferred, a single electrode structure could be utilized in place of electrodes 173 and 175 in the form of a traveling wave configuration. However, for the latter configuration, thicker electrodes would be required relative to the preferred configuration, in order to reduce electrode resistive losses. Also, for the latter configuration, an impedance transformer or additional resistor may be required in each of the impedance matching circuits 151 and 153. Note also that to obtain the desired characteristic impedance for the matching circuits 151 and 153, the value of inductor 167 is typically twice the inductance of inductors 165 and 169, with the values being chosen to match the capacitance of the electrodes of phase modulators 85 and 87, respectively, for obtaining the correct characteristic impedance for matching circuits 151 and 153, respectively. Inductors 165, 167, 169 can be provided by high-impedance transmission lines stubs connected with bond wires in a printed circuit board layout, for example.

The power splitter 145 can be provided by a wideband hybrid transformer, or in the application of in-phase feeding of the rf electrodes 181 and 183, respectively, a resistive power splitting network can be used. Adjustable delay circuit 161 can be provided by an all pass discrete component network with variable components, or by a folded transmission line with adjustable band connections. The adjustable amplitude circuit 163 can be provided by any commonly available variable attenuator, or from a resistive network with variable components, as would be known to one of skill in the art.

Although various embodiments of the invention have been illustrated and described herein, they are not meant to be limiting. Those skilled in the art may recognize modifications to these various embodiments, which modifications are meant to be covered by the spirit and scope of the appended claims.

What is claimed is:

1. An integrated optical phase modulator for linearly modulating a light signal, comprising:
   a substrate;
   light signal receiving means for dividing a light signal into first and second light input signals of substantially equal power level;
   first optical phase modulator means for receiving said first and second light signals, and modulating the light signals by a first rf signal, thereby producing modulated first and second complementary secondary output signals;
   a first optical coupler having a pair of input ports for receiving said first and second secondary output signals, and a pair of output ports;
   second optical phase modulator means connected to said pair of output ports of said first optical coupler for receiving and then modulating said first and second secondary output signals by a second rf signal, thereby producing complementary third and fourth secondary output signals;
   a second optical coupler connected to said second optical phase modulator means for individually receiving said third and fourth secondary output signals;
   first and second light waveguide means each having an input port connected to first and second output ports, respectively, of said second optical coupler, said first and second light waveguide means each having an output port for providing complementary and linearized first and second modulated light output signals; and
   said light signal receiving means, first and second optical phase modulator means, first and second optical couplers, and first and second waveguide means, all being formed on said substrate.

2. The integrated optical phase modulator of claim 1, wherein said light signal receiving means consists of a Y-branch power splitter.

3. The integrated optical phase modulator of claim 1, wherein said light signal receiving means consists of a 3 dB coupler.

4. The integrated optical phase modulator of claim 1, further including means for compensating for asymmetric phase modulation in said phase modulator.

5. The integrated optical phase modulator of claim 4 wherein said means for compensating for asymmetric phase modulation includes dc bias electrode means in each one of said first and second optical phase modulator means, for receiving first and second dc bias voltages, respectively, whereby the levels of said first and second dc bias voltages are adjusted relative to one another for providing compensation for the asymmetric phase modulation.

6. The integrated optical phase modulator of claim 1, further including means for compensating for fabrication inaccuracies causing deviations of coupling angle values of said first and second fixed couplers, respectively, from predetermined values.

7. The integrated phase modulator of claim 6, wherein said compensating means for coupling angle errors includes means for individually adjusting at least one of the amplitudes of said first and second rf signals.

8. The integrated phase modulator of claim 7, wherein said coupling angle error adjusting means includes:
   a power splitter for receiving an rf signal $V(t)$, and splitting $V(t)$ into two substantially equal rf signals $V_1(t)$ and $V_2(t)$; and
   first and second variable attenuators for receiving said $V_1(t)$ and $V_2(t)$ rf signals, respectively, for selectively adjusting the amplitudes of these rf signals, thereby producing said first and second rf signals.

9. The integrated phase modulator of claim 6, wherein said coupling error adjusting means further includes:
   first and second matching circuitry means connected between individual output terminals of said compensating means and individual rf input terminals of said first and second optical phase modulator means, respectively, for ensuring a flat and equal frequency response by said first and second optical phase modulator means to said first and second rf signals.

10. In an integrated optical phase modulator provided on a substrate, a method for maximizing the linearity thereof comprising the steps of:
   forming a light splitting device, for splitting an input light signal into first and second input light signals;
   forming a first optical phase modulator in cascade with said light splitting device;
   forming a first optical coupler in cascade with said first optical phase modulator;
   forming a second optical phase modulator in cascade with said first optical coupler;
   forming a second optical coupler in cascade with said second optical phase modulator; and
   applying first and second rf modulating signals to said first and second optical phase modulators, respectively, for modulating said first and second input light signals, for producing first and second complementary output signals at output ports, respectively, of said second fixed coupler.

11. The method of claim 10, further including the step of adjusting the levels of at least one of said first and second rf modulating signals, for compensating for errors in the coupling angles of said first and second couplers.

12. The method of claim 10, further including the step of:
forming dc bias electrodes on said first and second optical phase modulators; and
applying and adjusting the levels of first and second dc bias voltages to said dc bias electrodes of said first and second phase modulators, respectively, for compensating for asymmetric phase modulation caused by fabrication inaccuracies in forming said integrated optical phase modulator.

13. A cascaded integrated optical phase modulator for linearly modulating a light signal, comprising:
a substrate;
receiving waveguide means for receiving a light input signal, and splitting said signal into first and second input light signals;
a first optical phase modulator including a first waveguide segment having one end connected to said receiving waveguide means for receiving said first input light signal, a second waveguide segment parallel to said first waveguide segment having one end connected to said receiving waveguide means for receiving said second input light signal, first and second modulating electrode means in parallel with and spaced apart from a portion of each one of said first and second waveguide segments, respectively, said first and second modulating electrode means being connected in common for receiving a first rf modulating signal, and first and second dc bias electrode means in parallel with and spaced apart from another portion of each one of said first and second waveguide segments, respectively, said first and second dc bias electrode means being connected in common for receiving a first dc bias voltage;
a first optical coupler including first and second parallel waveguide segments each having one end individually connected to another end of each one of said first and second waveguide segments, respectively, of said first optical phase modulator;
a second optical phase modulator including a first waveguide segment having one end connected to another end of said first waveguide segment of said first optical coupler, a second waveguide segment parallel to said first waveguide segment having one end connected to another end of said second waveguide segment of said first optical coupler, said second optical phase modulator further including first and second modulating electrode means in parallel with and spaced apart from a portion of each one of said first and second modulating electrode means being connected in common for receiving a second rf modulating signal, and first and second dc bias electrode means in parallel with and spaced apart from another portion of each one of said first and second waveguide segments, respectively, said first and second dc bias electrode means being connected in common for receiving a second dc bias voltage;
output waveguide means connected individually to another end of each one of said first and second waveguide segments, respectively, of said second optical phase modulator, for providing first and second complementary light output signals, whereby the levels of said first and second dc bias voltages, and the amplitudes of at least one of said first and second rf modulating signals, are adjusted for maximizing the linearization of said first and second output signals; and
said receiving waveguide means, first and second optical phase modulators, first and second optical couplers, and output waveguide means all being formed on said substrate.

14. The cascaded integrated optical phase modulator of claim 13, wherein said first optical phase modulator further includes:
first and second reference voltage electrodes in parallel with said first and second modulating electrodes, respectively, with said first and second waveguide segments lying therebetween, respectively; and
third and fourth reference voltage electrodes in parallel with first and second dc bias electrode means, respectively, with said first and second waveguide segments lying therebetween, respectively, whereby said first through fourth reference voltage electrodes are each receptive of a source of reference voltage.

15. The cascaded integrated optical phase modulator of claim 14, wherein said second optical phase modulator further includes:
first and second reference voltage electrodes in parallel with said first and second modulating electrodes, respectively, with said first and second waveguide segments lying therebetween, respectively; and
third and fourth reference voltage electrodes in parallel with first and second dc bias electrode means, respectively, with said first and second waveguide segments lying therebetween, respectively, whereby said first through fourth reference voltage electrodes are each receptive of a source of reference voltage.

16. The cascaded integrated optical phase modulator of claim 13, further including an external source of adjustable first and second rf modulating voltages including:
a splitter for receiving and splitting an rf voltage signal into first and second rf modulating signals; and
at least one variable attenuator for selectively controlling the amplitude of at least one of said first and second rf modulating signals, for compensating for errors in the coupling angles of said first and second optical couplers.

17. The cascaded integrated optical phase modulator of claim 13, further including:
an external source of first and second rf modulating voltages;
first and second impedance matching means connected between individual output terminals of said external source of first and second rf modulating voltages, and said first and second optical phase modulators, respectively, for matching the impedance therebetween.

18. The cascaded integrated optical phase modulator of claim 13, wherein said receiving waveguide means consists of a Y-branch power splitter.

19. The cascaded integrated optical phase modulator of claim 13, wherein said receiving waveguide means consists of a 3 dB optical coupler.

20. A linearized cascaded optical phase modulator, comprising:

signal splitter waveguide means for receiving a light signal, and splitting the same into first and second light input signals;

a first and second optical phase modulator stages each including first and second elongated, parallel and spaced apart waveguides, first through third juxtaposed radio-frequency-interference (RFI) electrodes each having an elongated rectangular configuration, each overlying and centered upon said first and second waveguides, first through third signal electrodes centrally located between and parallel with said first and second waveguides within said rectangular configured RFI electrodes, respectively, first through third electrical terminal pads located outside of said first through third RFI electrodes, respectively, and first through third connecting electrodes for connecting said first through third terminal pads to said first through third signal electrodes, respectively, through openings in side members of said first through third RFI electrodes, respectively;

said first and second waveguides of said first phase modulator stage being connected for receiving said first and second light input signals;

a first optical signal coupler located between said first and second optical phase modulator stages for connecting the two in cascade with one another;

first and second spaced apart output waveguides each for providing at one end first and second complementary light output signals, respectively;

a second optical coupler connected between output ends of said first and second waveguides of said second phase modulator stage, and the other ends of said first and second output waveguides;

said RFI electrodes of said first and second phase modulator stages each being connected to a source of reference potential;

said first and second terminal pads of said first phase modulator stage each being adapted for receiving a first modulating signal;

said first and second terminal pads of said second phase modulator stage each being adapted for receiving a second modulating signal;

said third terminal pads of said first and second phase modulator stages being adapted for receiving first and second dc bias voltages respectively; and a substrate upon which said linearized cascaded optical phase modulator is formed.

* * * * *

UNITED STATES PATENT AND TRADEMARK OFFICE
CERTIFICATE OF CORRECTION

PATENT NO. : 5,249,243
DATED : Sep. 28, 1993
INVENTOR(S) : Skeie

It is certified that error appears in the above-identified patent and that said Letters Patent is hereby corrected as shown below:

On the Title Page, Item [73]:
delete: "Siemens Components, Inc., Iselin, N.J."
and insert in its place:
--Crystal Technology, Inc., Palo Alto, CA--

Signed and Sealed this

Twenty-first Day of June, 1994

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,249,243

DATED : September 28, 1993

INVENTOR(S) : Skeie

It is certified that error appears in the above-identified patent and that said Letters Patent is hereby corrected as shown below:

In Column 9, line 61, insert --0-- after "=".

In Figure 2, delete "Input Intensity" and insert --Output Intensity-- and delete "X" in the x-axis labelling.

In Figure 4, delete "X" in the x-axis labelling.

In Figure 5, delete "X" in the x-axis labelling.

In Figure 6, delete "Input Intensity" and insert --Output Intensity--.

In Figure 11, delete "Input Intensity" and insert --Output Intensity-- and delete "X" in the x-axis labelling.

Signed and Sealed this

Twelfth Day of December, 1995

Attest:

BRUCE LEHMAN

*Attesting Officer*

*Commissioner of Patents and Trademarks*